(12) United States Patent
Masse

(10) Patent No.: US 9,784,547 B2
(45) Date of Patent: Oct. 10, 2017

(54) DEVICE FOR THE SURVEILLANCE OF A WEAPON SYSTEM, PARTICULARLY OF MISSILE TYPE

(71) Applicant: MBDA FRANCE, Paris (FR)

(72) Inventor: Pascal Masse, Plaisir (FR)

(73) Assignee: MBDA FRANCE, Paris (FR)

( * ) Notice: Subject to any disclaimer, the term of this patent is extended or adjusted under 35 U.S.C. 154(b) by 475 days.

(21) Appl. No.: 14/385,522

(22) PCT Filed: Mar. 14, 2013

(86) PCT No.: PCT/FR2013/000069
§ 371 (c)(1),
(2) Date: Sep. 16, 2014

(87) PCT Pub. No.: WO2013/140050
PCT Pub. Date: Sep. 26, 2013

(65) Prior Publication Data
US 2015/0051873 A1 Feb. 19, 2015

(51) Int. Cl.
*F42B 35/00* (2006.01)
*G02B 27/01* (2006.01)

(52) U.S. Cl.
CPC ........ *F42B 35/00* (2013.01); *G02B 2027/014* (2013.01)

(58) Field of Classification Search
CPC .......................... G02B 2027/014; F42B 35/00
USPC .............. 702/150, 152, 187, 188; 340/815.4, 340/870.07; 244/3.11; 320/111; 367/40
See application file for complete search history.

(56) References Cited

U.S. PATENT DOCUMENTS

| | | | | |
|---|---|---|---|---|
| 5,681,008 A | * | 10/1997 | Kinstler | F41G 7/007 244/3.11 |
| 7,526,403 B2 | * | 4/2009 | Hogan | F41G 3/08 345/174 |
| 7,982,428 B2 | * | 7/2011 | Kim | H02J 7/045 320/111 |
| 2003/0058130 A1 | | 3/2003 | Kramer et al. | |

(Continued)

FOREIGN PATENT DOCUMENTS

EP 0305285 A1 3/1989
EP 1992904 A2 11/2008

OTHER PUBLICATIONS

ISA/EP International Search Report dated Jun. 5, 2013 re PCT Application No. PCT/FR2013/000069, filed Mar. 14, 2013.

(Continued)

*Primary Examiner* — John H Le
(74) *Attorney, Agent, or Firm* — Patrick J. Daugherty; Driggs, Hogg, Daugherty & Del Zoppo Co., LPA

(57) ABSTRACT

Aspects provide a surveillance device that is autonomous and includes data processing components which, in real time, process values measured by measurement components and transmit the results of processing operations to logging components for logging, the measurement components including elements that measure values of parameters representative of a mechanical environment and elements that measure values of parameters representative of a climatic environment. Aspects also include restitution components that enable restitution of the logged data and results of processing operations at any time.

17 Claims, 2 Drawing Sheets

(56) References Cited

U.S. PATENT DOCUMENTS

2007/0067138 A1 3/2007 Rabin et al.
2013/0028051 A1* 1/2013 Barkved ............... G01V 1/288
　　　　　　　　　　　　　　　　　　　367/40

OTHER PUBLICATIONS

Antonios Deligiannakis et al, Compressing Historical Information in Sensor Networks, SIGMOD, Paris, France, Copyright, ACM, 2004.

* cited by examiner

DEVICE FOR THE SURVEILLANCE OF A WEAPON SYSTEM, PARTICULARLY OF MISSILE TYPE

RELATED APPLICATION

This application is a national filing of PCT application Serial No. PCT/FR2013/000069, filed Mar. 14, 2013.

The present invention relates to a device for the surveillance of a weapon system.

The present invention relates particularly, although not exclusively, to a weapon system such as a missile of whatever type. Such a missile is generally stored and transported in a container.

This surveillance device relates particularly to monitoring the environment of the weapon system over a long period comprising, for example, storage periods and/or transport and travel periods, in order to inform an operator of the risk of damage to the weapon (missile), particularly with a view to managing a plurality of weapons or with a view to maintenance and logistics.

There are known devices for logging data, of the "data logger" type, which can monitor the environment of a piece of equipment. These common devices measure data, and they date and log the measured raw data as such. These common devices do, however, have drawbacks. In particular, they have a large memory capacity requirement, since they log all the data, and great power requirements, in order to function. Moreover, they are very bulky and are not suitable for military use in that they cannot be used in the applications envisaged for a weapon system.

The object of the present invention is to remedy these drawbacks. It relates to a device for the surveillance of a weapon system, which can be implemented in the aforementioned military applications.

To this end, according to the invention, said device of the type including:
  means for measuring parameter values;
  data logging means;
  means for restoring logged data; and
  electric power supply means,
is remarkable in that it is autonomous and also includes data processing means that process in real time the values measured by said measurement means and transmit at least the results of the processing operations to said logging means for logging them, and in that said measurement means include components for measuring the values of parameters representative of the mechanical environment and components for measuring the values of parameters representative of the climatic environment, and in that said restoration means allow the logged data and at least the results of the processing operations to be restored at any time.

Thus, using the device according to the invention, the measured values are not logged as such, but rather are processed within said device, and the logged results have a smaller volume than the raw data, which makes it possible, in particular, to:
  reduce the storage volume required and thus to limit cost; and
  reduce the electric power consumption and thus increase the autonomy of the surveillance device.

Moreover, the measurements and processing operations performed allow continuous and relatively global surveillance of the environment, while being capable of providing an operator with information on this surveillance and particularly summary information on the state of the weapon system, at any time.

As shown in greater detail below, the invention provides a surveillance device for a weapon system, which is capable of being autonomous for at least 5 to 10 years, is compact in size and inexpensive, and makes it possible to:
  identify the monitored system;
  produce a historical log (based on dating of the measured data);
  measure both the climatic and mechanical environment;
  monitor potential damage; and
  detect ageing by internal and/or external calculations.
This surveillance makes it possible, in particular, to:
  simplify logistics;
  allow individual management of, for example, missiles;
  manage stocks;
  optimise maintenance periods by monitoring life cycles;
  extend the service life of the systems; and
  manage warranties.

The surveillance device according to the invention is designed for military use (with special conditions to be met with regard to temperature (−40° C. to +85° C.), humidity (0 to 100%), vibrations etc.). Preferably, it is fixed to or within a container provided with one or more missiles.

Furthermore, advantageously, said measurement means are formed so as to be able to date the values measured. Moreover, said measurement means include at least some of the following components:
  an impact measurement sensor;
  a vibration measurement sensor;
  a movement measurement sensor;
  a temperature measurement sensor;
  a humidity measurement sensor; and
  a pressure measurement sensor.

In addition, in a preferred embodiment, said device has a rigid housing, which is provided with:
  a hermetic space containing at least the logging means, the restoration means, the data processing means and mechanical sensors forming part of said measurement means; and
  a non-hermetic space containing at least climatic sensors (temperature, humidity and pressure measurement sensors) forming part of said measurement means.

Advantageously, said housing is also provided with a location for at least one optional printed circuit board, which gives it a potential for internal expansion.

Furthermore, in a preferred embodiment, said surveillance device includes an activation tab that is accessible from outside the housing and can be removed by an operator, together with associated means that make it possible, when the activation tab is removed, to provide a power supply to all the electrical components of the device using at least one internal battery, with a view to activating the functions of said device. This activation is irreversible until the internal battery is flat (which period can if necessary be extended by means of an external power supply), in order to limit the potential for use by an unauthorised operator and to increase the level of confidence when managing warranties and data processing (in the event of a power cut, the date is reset to a common reference date).

Furthermore, advantageously, said surveillance device also includes hermetic connectors allowing the device to be connected to external equipment in order to perform at least one of the following actions:
  communicating with the device; and
  supplying electric power to the device, which allows the internal battery to be conserved, for instance.

In addition, advantageously, said device also includes:

at least one interrogation means allowing an operator to generate a request to obtain information from said data restoration means; and information presentation means (PC interface, USB connection etc.), which are connected to said data restoration means and allow logged information to be provided to an operator, particularly in response to a request. Advantageously, said information presentation means include at least one light-emitting diode giving the operator status information (results of a self-test, surveillance status etc.).

Furthermore, advantageously, said electric power supply means comprise an internal battery, together with means for supplying external power.

The present invention therefore provides a surveillance device having great autonomy (at least 5 to 10 years), which is compatible with the conditions of a military environment and use of a missile, while being inexpensive, easy to use and capable of expansion.

In addition, the present invention also relates to a weapon system, provided in particular with a missile, which includes a surveillance device as mentioned above.

In this case, advantageously, the housing of said device is fixed to a missile container. Moreover, the shape of said housing is conformed to the shape of said missile container, which permits varied use, particularly allowing it to be mounted on containers already in existence.

The figures in the accompanying drawing will make it easy to understand how the invention can be illustrated. In these figures, identical reference numerals denote similar components.

Figure 1:
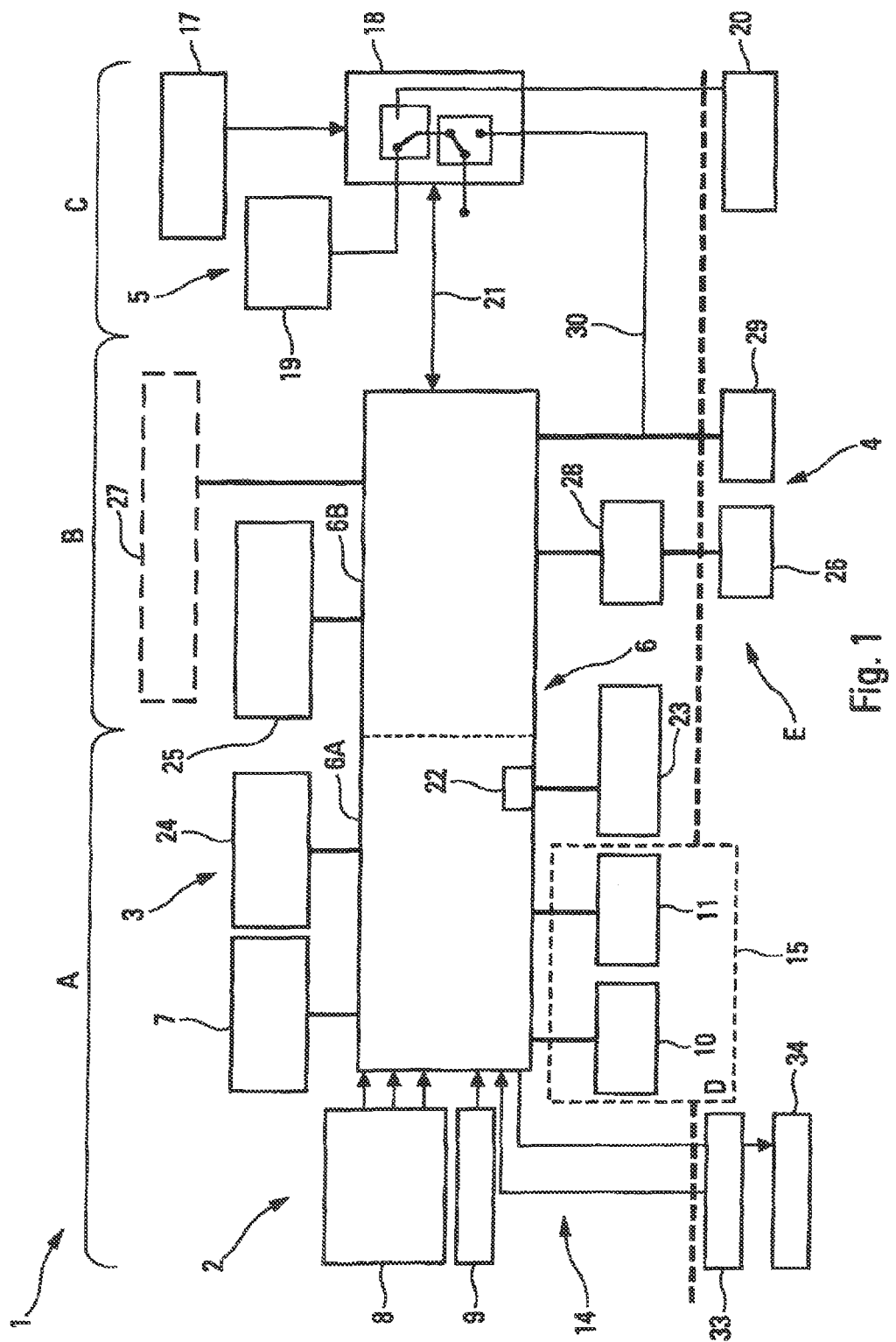
FIG. 1 is the overall diagram of a surveillance device according to the invention.

The device 1 according to the invention and shown diagrammatically in FIG. 1 is intended for monitoring the environment of a weapon system (not shown), particularly a container provided with a missile, over a long period comprising for example storage periods and/or transport periods, in order to inform an operator of the risk of damage to the weapon, particularly with a view to managing a plurality of weapons or with a view to maintenance.

Said device 1 is of the type including:
means 2 for measuring parameter values;
data logging means 3;
means 4 for restoring logged data; and
power supply means 5, According to the invention, said device 1 is autonomous and also includes data processing means 6 that process in real time the values measured by said measurement means 2 and transmit at least the results of these processing operations to said logging means 3 for logging them.

Moreover, said measurement means 2 include components 7, 8 and 9 (described below) for measuring parameters representative of the mechanical environment and components 10 and 11 (also described below) for measuring parameters representative of the climatic environment of said device 1 and therefore of the weapon system with which it is associated. Furthermore, said restoration means 4 allow the logged data and particularly the results of the processing operations to be restored at any time (particularly when requested).

Thus, using the device 1 according to the invention, the measured data are not logged as such, but rather are processed within said device 1 (by the means 6) and the results logged (by the means 3) have a smaller volume than the raw data measured by the means 2, which makes it possible, in particular, to:
reduce the storage volume required and thus to limit the cost of the device 1; and
reduce the electric power consumption and thus increase the autonomy of the device 1.

Moreover, the measurements and processing operations performed allow continuous and relatively global surveillance of the environment, while providing an operator with information on this surveillance and, in particular, summary information on the state of the weapon system, at any time.

As shown in greater detail below, the invention provides a surveillance device 1 for a weapon system, which is capable of being autonomous for at least 5 to 10 years, is compact in size and inexpensive, and makes it possible to:
identify the monitored system;
produce a historical log (based on dating of the measured data);
measure both the climatic and mechanical environment;
monitor potential damage; and
detect ageing by internal and/or external calculations.

This surveillance makes it possible, in particular, to:
simplify logistics;
allow individual management of, for example, missiles;
manage stocks;
optimise maintenance periods by monitoring life cycles;
extend the service life of the systems; and
manage warranties.

Figure 2:
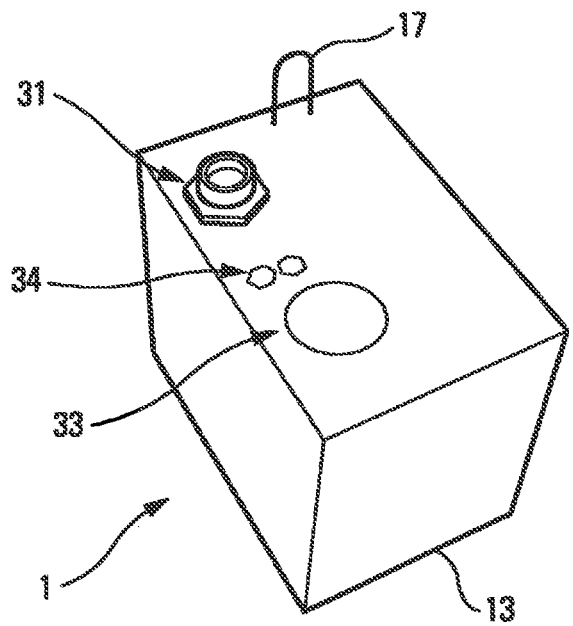
FIG. 2 is a perspective diagrammatic view of a housing of a device according to the invention.
Figure 3:
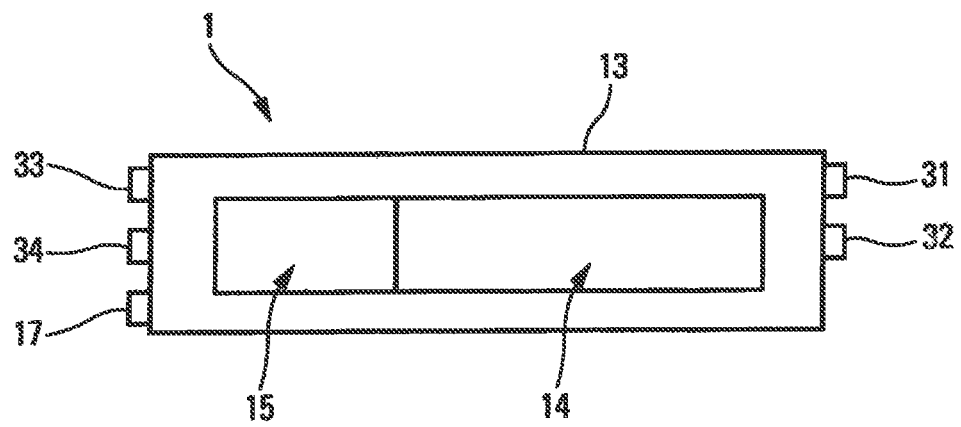
FIG. 3 illustrates very diagrammatically various parts of a device according to the invention.

In a preferred embodiment, said device 1 has a rigid housing 13, as shown in perspective in FIG. 2. This rigid housing 13 is provided with two mechanical portions 14 and 15, as illustrated in FIGS. 1 and 3, namely:
a main hermetic space (or portion) 14 containing at least the logging means 3, the restoration means 5, the data processing means 6 and mechanical sensors 7, 8 and 9 forming part of said measurement means 2. This hermetic space 14 therefore contains the digital processing portion. As described below, this space 14 contains the main board with the memories, microcontroller(s), mechanical sensors (vibration and impact), most of the functions, and also a location for an optional printed circuit board; and
a climatic space (or portion) 15, which is of necessity non-hermetic, containing the climatic sensors 10 and 11 (pressure, temperature, humidity etc.) forming part of said measurement means 2.

The surveillance device 1 according to the invention is designed for military use (with special conditions to be met with regard to temperature (−40° C. to +85 ° C.), humidity (0 to 100%), vibrations etc.). Preferably, it is fixed to or within a missile container. Moreover, the shape of said housing 13 is conformed to the shape of said missile container, which permits varied use, particularly allowing it to be mounted on containers already in existence, while the mechanical locations available on said containers can differ greatly in shape and size.

Furthermore, in a preferred embodiment, said surveillance device 1 also includes an activation tab 17 that is accessible from outside the housing 13 (FIG. 2) and is capable of being removed by an operator, together with associated means 18 that make it possible, when the activation tab 17 is removed, to provide a power supply to all the electrical components of the device 1 (as illustrated by a double-headed arrow 21 in FIG. 1) using an internal battery 19 or an external power supply 20 if available, which initiates the operation of the functions of the device 1. This activation is irreversible until the internal battery 19 is flat (which period can if necessary be extended by means of an external power supply 20), in order to limit the potential for use by an unauthorised operator and to increase the level of confidence when managing warranties and data processing (in the event of a power cut, the date is reset to a common reference date). This tab 17 is preferably red, like the safety flags of the weapons.

The present invention therefore provides a surveillance device 1 that is autonomous (internal battery, external power supply) and that logs and processes in real time the parameters of the environment to which it is subject, so as to restore them at any time. It has the ability to calculate, process, compare, date, save and restore data. This surveillance device 1 has at least 5 to 10 years' autonomy, which is compatible with the conditions of a military environment and use of a missile, while being inexpensive, easy to use and capable of expansion. Moreover, it is very compact and inexpensive, and allows additional external means (communications, remote sensor systems etc.) to be added, as mentioned below.

The various functional units or assemblies A, B, C, D and E illustrated in FIG. 1 are now described.

The objective of the assembly A is to manage all the principles and methods for measuring, calculating, comparing, processing, assessing, monitoring, dating, formatting and backing up the data generated by the built-in sensors.

The means 6 comprise two microcontrollers 6A and 6B, one of which is designed for managing the functions of the device 1 and the other for managing external communications. These microcontrollers 6A and 6B have very low consumption. It is possible to use just one microcontroller if it has enough computing power to manage both surveillance and communications.

These microcontrollers are fitted with real-time clocks 22 (RTCs)—year, date, hour, minute, second—which are used for dating events.

The dating function is performed by a very low-consumption, temperature-controlled oscillator and a factory-set real-time clock (RTC) 23 supplied with power from the battery 19.

The internal RTC clocks 22 are initialised, after the activation tab 17 is pulled out, by reading the common RTC clock 23. Before the activation tab 17 is pulled out, the microcontrollers 6A and 6B are not supplied with power. The date and time are available in the high-precision, very low consumption, common RTC clock 23, which uses the internal battery 19 right from the factory. After activation, the RTC clocks 22 of the microcontrollers 6A and 6B are regularly synchronised with the common RTC clock 23.

For the memories 24 of the means 3, flash and FRAM memories are used.

The FRAM memory has low consumption, is non-volatile, and allows infinite accessing without a complex access protocol, but it has a limited memory size. It is used for repeated accesses to the same addresses, such as for programming parameters, identifiers and user information. As it is non-volatile, it ensures that all the data are stored in the case of a loss of power.

The flash memory consumes much more power, is non-volatile, offers greater memory capacity, but requires a slower and much more complex by-page logging procedure.

In addition, the built-in sensors 7 to 11 monitor the following parameters: temperature, humidity, pressure, vibration, impact, movement detection, internal power voltage (battery). By using direct measurements, these sensors perform the following functions:

surveillance, measurements, and dating of out-of-specification instances; and measurements and dating of temperature, pressure, humidity, vibration (timing charts).

Furthermore, these sensors use calculations to perform the following functions:

measuring pressure differential;
calculating ageing laws;
measuring the effective g-force of the vibrations;
measuring vibrations;
measuring impacts;
measuring the spatial orientation of the device 1;
determining temperature cycles;
producing histograms: climatic, specific humidity, mechanical.

The space 14 can contain:

one or more sensors 7 (accelerometers) for measuring impacts (in three axes). Such a sensor can be of the MEMS or piezo-electric type. They need to be able to measure at least ±120 g over the 0-400 Hz band. If the accelerometers are hibernating, they are woken up as soon as a level of g-force measured by the vibration accelerometer is exceeded (for example, 10 g);

a sensor 8 (accelerometer) for measuring vibrations (in three axes). There is a single 3-axis sensor with a ±16 g range over the 0.1-1600 Hz band. This sensor offers a movement detection capacity (over threshold) by sampling, of 1 to 8 Hz; and a movement detection sensor 9 of the analogue, electromechanical type.

In addition, the space 15 contains:

a temperature and humidity sensor 10, which is a low-consumption component outputting digital information via a serial connection; and a pressure sensor 11, which is also a low-consumption component outputting digital information via a serial connection.

The assembly B has the objective of managing external communication means. These means comprise at least one USB connection and a bus for communication to optional external modules.

In the example in FIG. 1, this assembly B comprises a backup memory 25, external modules 26 and an optional internal board 27. The optional internal board 27 is designed to add one or more geolocation and/or low-consumption wireless communications means. This optional internal board 27 can also be used for additional internal sensors with measurement of salinity, luminosity, radiofrequency level, sound level or chemical composition. An appropriate location is provided in the housing 13 for this optional internal board 27.

The external modules 26 are optional modules to be added as required. These modules 26 are either additional sensor or detection systems, or short- or long-range communication modules.

These modules can communicate with each other so as to transmit and receive data.

The memory 25, in this case a flash memory, is therefore used for storing data from the optional internal board 27 and/or the optional external modules 26. The memory space is shared by means of configuration parameters accessible to the operator.

Furthermore, a function 28 has the role of separating an I²C connection from the external modules and adapting the level of the communication lines of the I²C bus to the voltage level of that connection. The external modules use their own power supply and may want to control the high level of this communication voltage. The device authorises this connection only in case of need. The high voltage level of the communication lines can be equal to or independent of the power supply level of the device.

Furthermore, a ground station 29 has to accept the wired USB communications. It makes it possible to configure the device 1 (parameters, identifiers), to log the data for hardware monitoring by the operator, to download all or some of the logged data, and to carry out factory-level or end-user-level tests and/or calibrations. The ground station 29 provides power to the device via the USB line 30 throughout the connection time. The USB power supply replaces the internal battery 19 and the external power supply 20.

The objective of the assembly C is to manage the power supply modes.

The device 1 therefore has an internal battery 19 and can also be supplied by external power 20 (battery/ies or some other common electric power supply means) or by a USB connector 30. The (non-rechargeable) battery 19 is, for example, of the $LiSOCl_2$ type and supports the envisaged temperature range (−60° C. a +90° C.), impacts, vibrations and altitude. It has a large power capacity.

An additional external power supply (battery, power supply) can be connected via the external bus connector of the optional modules. This power supply must be between 2.4 V and 3.6 V. This power supply takes priority over the internal battery 19 when its voltage is much less than 2.8 V. The battery 19 is thus preserved for as long as the external power supply is operative. The external power supply 20 is activated when its voltage value is sufficient for effective operation. If the voltage value is insufficient, the internal battery 19 takes over automatically.

Furthermore, when there is a USB connection, the device 1 is powered by PC. The internal battery 19 and the external power supply 20 (where present) are not subjected to a load when there is a USB connection.

When first delivered, the device 1 is delivered programmed (date, time, parameters) and only its baseline functions (date, time) are active. The end operator has the task of activating the operational phase of the device, activating the general power supply by pulling out the activation tab 17. From that moment on, all the functions have access to the main power supply, which is distributed, as a minimum, by the internal battery 19 or by the external power supply 20, if any. Switching between the different power supply modes happens automatically and does not cause the device 1 to be reset.

The order of priority of the power supply means is:
1) USB connector 30, whether or not the activation tab 17 is in place;
2) external power supply 20, if the activation tab 17 is no longer in place and there is no USB connector 30;
3) the internal battery 19, if the activation tab 17 is no longer in place and there is no USB connector 30 or external power supply 20.

In addition, with respect to the portion D (non-hermetic zone 15) in FIG. 1, the climatic sensors (pressure and humidity) at the very least must be located in the non-hermetic zone 15 in order to perform their functions. To reduce the time needed to sense a change in temperature (but also for practical reasons), the temperature sensor 10 is also placed in this zone. However, there is a second internal temperature sensor (not shown) in the hermetic zone 14 for self-test purposes and for operating in degraded mode if the main sensor is declared to be out-of-service, temperature being the minimum factor that has to be measured.

In addition, the assembly E relates to the external, operator-accessible hardware (HCI). These components comprise in particular:

a USB connector, which is a hermetic connector 31 (shown in FIGS. 2 and 3), which allows the device 1 to be connected to a USB function of external equipment (for example, a PC) in order to communicate (read/write) and supply power to the device 1 while the USB connection is made. This allows the internal battery 19 and/or external power supply 20 to be preserved during USB communication phases;

at least one external module connector 32 (shown in FIG. 3), which is a hermetic connector that allows the device 1 to be connected to optional additional external modules via an $I^2C$ bus and a specific protocol and/or allows an additional external power supply to be connected;

a push-button 33, which allows an operator to activate a request to the microcontroller in order to obtain information. The reply to the request (for self-test, surveillance status etc.) can be obtained either via light-emitting diodes 34 or by a USB connection and its PC interface, if connected;

light-emitting diodes 34, for example a green light-emitting diode and a red light-emitting diode, which allow an operator to receive status information. To reduce consumption, they are not used for permanent reporting; and the activation tab 17.

These components (HCI), which are accessible to an operator, are preferably located in the non-hermetic zone 15. They may, however, also be placed in the hermetic zone 14.

The surveillance device 1 according to the invention, as described above, thus has the following particular advantages:

suitability for military use;
energy autonomy;
flexibility of power supply;
flexibility for expansion (external modules, protocol); and
capacity for internal expansion (internal board).

The invention claimed is:

1. A system for the surveillance of a weapon system, the system comprising:
    means for measuring parameter values comprising components for measuring values of parameters representative of a mechanical environment and components for measuring values of parameters representative of a climatic environment;
    a first memory device;
    data logging means for logging results data to the first memory device;
    means for restoring logged results data from the first memory device;
    power supply means;
    data processing means that processes in real time via processing operations the parameter values measured by said measurement means, and transmits results of the processing operations to said logging means for logging to the first memory device as the logged results data;
    a rigid housing that defines a hermetic space comprising the data logging means, the means for restoring logged data, the data processing means and mechanical sensors of said components for measuring values of parameters representative of mechanical environment of said means for measuring parameter values;

the rigid housing further defining a non-hermetic space comprising climatic sensors of said components for measuring values of parameters representative of a climatic environment of said means for measuring parameter values;

an activation tab that is accessible from outside the rigid housing and is capable of being removed by an operator;

means associated with the activation tab that, in response to removal of the activation tab, provides a power supply to electrical components of the system using at least one internal battery in order to activate functions of said system, wherein said activation is irreversible;

wherein the means for measureing parameter values comprises an internal real-time clock;

means for dating the measured parameter values that comprises a factory-set real-time clock that is supplied with power from the at least one internal battery;

wherein, in response to removal of the activation tab, the internal clock id initialized with and regularly synchronizes to a time of the factory-set real-time clock;

wherein the logging means stores the transmitted results of the processing operations on the first memory device as the logged results data without storing the parameter values measured by said measurement means on the first memory device, wherein storing the logged results data requires a volume amount of storage memory of the first memory device that is smaller than a volume amount of the storage memory of the first memory device that is required to store the parameter values measured by said measurement means; and wherein the system is autonomous, and said restoration means enables the logged results data of the processing operations to be restored at any time.

2. The system according to claim 1,
wherein the data processing means processes in real time via the processing operations the measured parameter values as a function of date data generated by the means for dating.

3. The system according to claim 1, wherein said rigid housing comprises a location for at least one optional printed circuit board.

4. The system according to claim 1, further comprising:
hermetic connectors that enable connection of the system to external equipment in order to perform at least one of the following actions: communicating with the system and supplying electric power to the system.

5. The system according to claim 4, wherein said means for measuring parameter values further comprises at least one of:
an impact measurement sensor;
a vibration measurement sensor;
a movement measurement sensor;
a temperature measurement sensor;
a humidity measurement sensor; and
a pressure measurement sensor.

6. The system according to claim 4, wherein said power supply means further comprise:
an internal battery; and
means by which external power can be supplied.

7. The system of claim 6, wherein the means by which external power can be supplied is an external power supply that is connected via an external bus connector of the hermetic connectors; and
wherein the power supply selects the external power supply over the internal battery for providing power in response to determining that the external power supply is supplying between 2.4 V and 3.6 V of power.

8. The system of claim 7, wherein the power supply means, in response to determining a connection to a personal computer via a USB connector of the hermetic connectors, removes a power supply load from the external power supply and from the internal battery.

9. The system of claim 8, wherein the power supply means supplies power by automatically switching to a one of the USB connection to the personal computer, the external power supply and the internal battery, by:
switching to the USB connection to the personal computer in response to determining that the USB connection to the personal computer is available;
switching to the external power supply in response to determining that the USB connection to the personal computer is not available and that the activation tab is removed; and
switching to the internal battery in response to determining that the USB connection to the personal computer is not available and that the activation tab is removed and that the external power supply is not available.

10. The system of claim 9, wherein the automatic switching by the power supply means to the one of the USB connection to the personal computer, the external power supply and the internal battery does not cause the system to be reset.

11. The system according to claim 1, further comprising:
at least one interrogation means that enable an operator to generate a request to obtain information from said means for restoring logged data.

12. The system according to claim 1, further comprising:
information presentation means that are connected to said means for restoring logged data and enable logged information to be provided to an operator.

13. The system according to claim 12, wherein said information presentation means include at least one light-emitting diode enabling an operator to obtain status information.

14. The system according to claim 1, wherein the system is a weapon system.

15. The weapon system according to claim 14, wherein the rigid housing is fixed to a missile container.

16. The weapon system according to claim 15, wherein a shape of said rigid housing is suited to a shape of said missile container within a fixing zone.

17. A system for the surveillance of a weapon system, the system comprising:
means for measuring parameter values comprising components for measuring values of parameters representative of a mechanical environment and components for measuring values of parameters representative of a climatic environment;
a first memory device;
data logging means for logging results data to the first memory device;
means for restoring logged results data from the first memory device;
power supply means;
data processing means that processes in real time via processing operations the parameter values measured by said measurement means, and transmits results of the processing operations to said logging means for logging to the first memory device as the logged results data;
a rigid housing that defines a hermetic space comprising the data logging means, the means for restoring logged data, the data processing means and mechanical sensors of said components for measuring values of parameters representative of mechanical environment of said means for measuring parameter values;

the rigid housing further defining a non-hermetic space comprising climatic sensors of said components for measuring values of parameters representative of a climatic environment of said means for measuring parameter values;

an activation tab that is accessible from outside the rigid housing and is capable of being removed by an operator;

means associated with the activation tab that, in response to removal of the activation tab, provides a power supply to electrical components of the system using at least one internal battery in order to activate functions of said system, wherein said activation is irreversible;

wherein the means for measureing parameter values comprises an internal real-time clock;

hermetic connectors that enable connection of the system to external equipment in order to perform at least one of the following actions: communication with the system and supplying electric power to the system;

wherein the logging means stores the transmitted results of the processing operations on the first memory device as the logged results data without storing the parameter values measured by said measurement means on the first memory device, wherein storing the logged results data requires a volume amount of storage memory of the first memory device that is smaller than a volume amount of the storage memory of the first memory device that is required to store the parameter values measured by said measurement means;

wherein the system is autonomous, and said restoration means enables the logged results data of the processing operations to be restored at any time;

wherein said means for measuring parameter values further comprises at least one of:

an impact measusrement sensor;

a vibration measurement sensor;

a movement measurement sensor;

a temperature measurement sensor;

a humidity measurement sensor; and a pressure measurement sensor; and wherein said mechanical sensors of said components within the hermetic space comprises:

a first accelerometer that measures vibrations in three axes over a range of plus/minus 16 g over a 0.1-to-1600 Hz band via sampling from 1 to 8 Hz;

a second accelerometer for measuring impacts in three axes over a range of plus/minus 120 g over a 0-to-400 Hz band, and wherein the second accelerometer hibernates and wakes in response to the first accelerometer measuring a vibration in excess of a 10 g threshold; and an analog, electromechanical movement detection sensor.

* * * * *